(12) United States Patent
Lin et al.

(10) Patent No.: US 10,527,886 B1
(45) Date of Patent: Jan. 7, 2020

(54) LED BACKLIGHT, BACKLIGHT MODULE, AND DISPLAY APPARATUS

(71) Applicant: Xiamen Tianma Micro-electronics Co., Ltd., Xiamen (CN)

(72) Inventors: Zongwei Lin, Xiamen (CN); Sichao Ke, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/175,037

(22) Filed: Oct. 30, 2018

(30) Foreign Application Priority Data

Aug. 23, 2018 (CN) .......................... 2018 1 0966820

(51) Int. Cl.
*G02F 1/1335* (2006.01)
*G02F 1/13357* (2006.01)

(52) U.S. Cl.
CPC .. *G02F 1/133606* (2013.01); *G02F 1/133603* (2013.01); *G02F 2001/133607* (2013.01); *G02F 2001/133613* (2013.01); *G02F 2001/133614* (2013.01)

(58) Field of Classification Search
CPC ......... G02F 1/133603; G02F 1/133606; G02F 2001/133607
USPC ............................... 362/97.2, 97.3
See application file for complete search history.

(56) References Cited

U.S. PATENT DOCUMENTS

| | | | |
|---|---|---|---|
| 8,810,749 B2 * | 8/2014 | Li | G02B 5/201 349/61 |
| 10,297,637 B2 * | 5/2019 | Chen | H01L 25/0753 |
| 2011/0012942 A1 * | 1/2011 | Kim | G02B 6/0016 345/690 |
| 2011/0194034 A1 * | 8/2011 | Shimizu | G02B 6/0016 348/739 |
| 2012/0014092 A1 * | 1/2012 | Lee | G02B 6/0021 362/97.1 |
| 2015/0097198 A1 * | 4/2015 | Illek | G02F 1/133603 257/88 |
| 2016/0349436 A1 * | 12/2016 | Zhang | G02B 6/0021 |
| 2018/0342654 A1 * | 11/2018 | Chen | H01L 25/0753 |

FOREIGN PATENT DOCUMENTS

| | | |
|---|---|---|
| CN | 204178089 U | 2/2015 |
| CN | 107170771 A | 9/2017 |
| CN | 107170772 A | 9/2017 |

* cited by examiner

*Primary Examiner* — William N Harris
(74) *Attorney, Agent, or Firm* — Anova Law Group PLLC

(57) ABSTRACT

An LED backlight, a backlight module, and a display apparatus are provided. The LED backlight includes: a substrate; a plurality of LED chips disposed on a first surface of the substrate and electrically connected to the substrate, where each LED chip includes a first light emitting surface disposed on a side of the LED chip facing away from the substrate and at least one second light emitting surface, and a plane where the at least one second light emitting surface is located intersects with the substrate; a plurality of prism-shaped light guide structures disposed between adjacent LED chips and in a space defined between two adjacent second light emitting surfaces of adjacent LED chips, where the prism-shaped light guide structures have an index of refraction of n1; and a first medium filling the space between the LED chips and the prism-shaped light guide structures.

20 Claims, 14 Drawing Sheets

LED BACKLIGHT, BACKLIGHT MODULE, AND DISPLAY APPARATUS

CROSS-REFERENCES TO RELATED APPLICATIONS

This application claims the priority of Chinese Patent Application No. 201810966820.4, filed on Aug. 23, 2018, the entire contents of which are incorporated herein by reference.

FIELD OF THE DISCLOSURE

The present disclosure generally relates to the field of display technology and, more particularly, relates to an LED backlight, a backlight module, and a display apparatus.

BACKGROUND

Currently, the usage of light emitting diode (LED) backlights in liquid crystal display panels has an over 90% penetration rate. A backlight module incorporating the LED backlight may be edge-lit or direct-lit. In the edge-lit LED backlight, LED light sources may be configured along the periphery of a light guide panel. After entering the light guide panel, the LED light is reflected and scattered by reflection films and reflection dots to light the back of the display panel. The drawbacks of the edge-lit LED backlight may include poor contrast and no local dimming. In the direct-lit LED backlight, the LED light sources may be configured directly on the back of the display panel. The direct-lit LED backlight may present images more accurately with vibrant colors and sharp contrast, thereby gradually dominating the market.

The direct-lit backlight module may often include a printed circuit board (PCB). A plurality of packaged LED chips may be configured on the PCB board. Light emitted from the LED chips may irradiate the LCD display panel to achieve the backlight function of lighting up the LCD display apparatus.

Generally, gaps may exist between adjacent LED chips in the LED direct-lit backlight module. When the LED chips emit light, brightness in the gap region may appear darker due to the absence of light illumination, thereby causing a so-called "*Gypsophila*" symptom. That is, the brightness is strong at the positions of the LED chips, and is weak in the gap regions between adjacent LED chips.

The disclosed LED backlight, backlight module, and display apparatus are directed to solve one or more problems set forth above and other problems.

BRIEF SUMMARY OF THE DISCLOSURE

One aspect of the present disclosure provides an LED backlight. The LED backlight comprises: a substrate; a plurality of LED chips disposed on a first surface of the substrate and electrically connected to the substrate, where each LED chip includes a first light emitting surface disposed on a side of the LED chip facing away from the substrate and at least one second light emitting surface, and a plane where the at least one second light emitting surface is located intersects with the substrate; a plurality of prism-shaped light guide structures disposed between adjacent LED chips and in a space defined between two adjacent second light emitting surfaces of adjacent LED chips, where the prism-shaped light guide structures have an index of refraction of n1; and a first medium filling the space between the LED chips and the prism-shaped light guide structures, where the first medium has an index of refraction of n2 and n1>n2. At least a portion of light emitted from the second light emitting surfaces of the LED chips is guided by the prism-shaped light guide structures to emit from a light emitting surface of the LED backlight. The light emitting surface of the LED backlight is parallel with a plane where the first light emitting surface is located.

Another aspect of the present disclosure provides a backlight module. The backlight module includes an LED backlight. The LED backlight includes: a substrate; a plurality of LED chips disposed on a first surface of the substrate and electrically connected to the substrate, where each LED chip includes a first light emitting surface disposed on a side of the LED chip facing away from the substrate and at least one second light emitting surface, and a plane where the at least one second light emitting surface is located intersects with the substrate; a plurality of prism-shaped light guide structures disposed between adjacent LED chips and in a space defined between two adjacent second light emitting surfaces of adjacent LED chips, wherein the prism-shaped light guide structures have an index of refraction of n1; and a first medium filling the space between the LED chips and the prism-shaped light guide structures, wherein the first medium has an index of refraction of n2 and n1>n2. At least a portion of light emitted from the second light emitting surfaces of the LED chips is guided by the prism-shaped light guide structures to emit from a light emitting surface of the LED backlight. The light emitting surface of the LED backlight is parallel with a plane where the first light emitting surface is located.

Another aspect of the present disclosure provides a display apparatus. The display apparatus includes a display panel and a backlight module. The backlight module includes an LED backlight. The LED back light includes: a substrate; a plurality of LED chips disposed on a first surface of the substrate and electrically connected to the substrate, wherein each LED chip includes a first light emitting surface disposed on a side of the LED chip facing away from the substrate and at least one second light emitting surface, and a plane where the at least one second light emitting surface is located intersects with the substrate; a plurality of prism-shaped light guide structures disposed between adjacent LED chips and in a space defined between two adjacent second light emitting surfaces of adjacent LED chips, wherein the prism-shaped light guide structures have an index of refraction of n1; and a first medium filling the space between the LED chips and the prism-shaped light guide structures, wherein the first medium has an index of refraction of n2 and n1>n2. At least a portion of light emitted from the second light emitting surfaces of the LED chips is guided by the prism-shaped light guide structures to emit from a light emitting surface of the LED backlight. The light emitting surface of the LED backlight is parallel with a plane where the first light emitting surface is located.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts.

DETAILED DESCRIPTION

Figure 1:
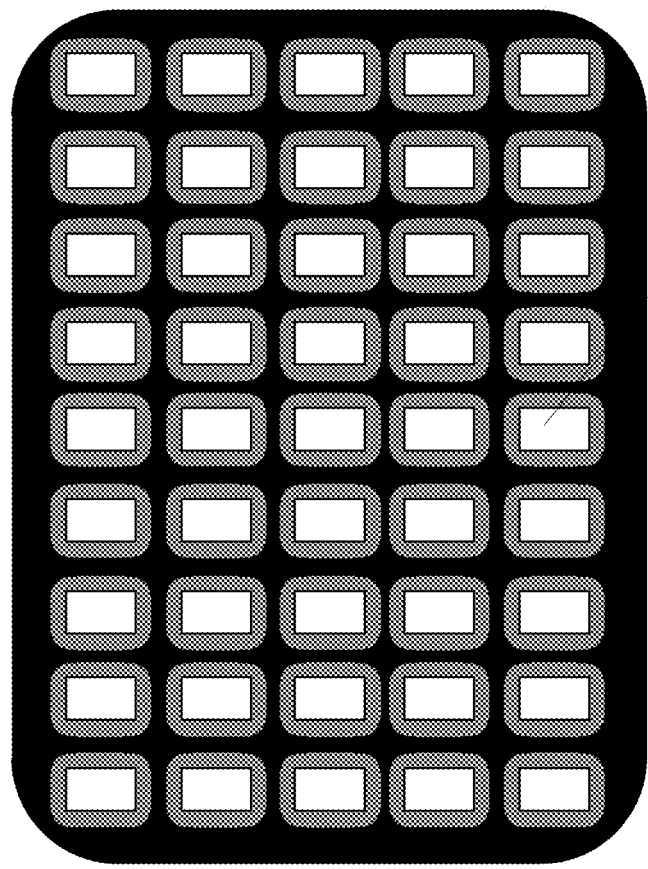
FIG. 1 illustrates a schematic view of a prior art LED backlight emitting light.

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. The same reference labels and numerals in the drawings denote the same or similar structures, and will not be described repetitively. The words and expressions of the positions and directions in the description of the present disclosure are illustrative with the pertaining drawings. However, changes may be made if necessary, and all the changes should be included in the scope of protection of the present disclosure. The drawings of the present disclosure are intended only to illustrate relative position relationship. Thicknesses of layers of certain parts may be enlarged for the convenience of comprehension, and may not represent the proportional relationship of the thicknesses of the actual layers.

It should be noted that the specific details set forth in the following description are intended for those skilled in the art to fully understand the present disclosure. However, the present disclosure may be embodied in various other forms. Those skilled in the art may derive other embodiments without departing from the spirit of the present disclosure. Thus, the present disclosure should not be limited to the disclosed embodiments. When certain terms are used to denote certain structures in the specification and the claims, those skilled in the art should understand that hardware manufacturers may use different terms to refer to the same structures. The specification and the claims may not differentiate the structures according to the terminology difference, but rather, according to the functionality difference. When the specification and the claims use the word "comprising" as an open-ended term, it should be interpreted as "including but not limited to". The following specification describes various preferred embodiments of the present disclosure. However, such description is intended to illustrate the general principles of the present disclosure, and is not intended to limit the scope of the present disclosure.

In the prior art, the direct-lit backlight module may often include a PCB board. A plurality of packaged LED chips may be configured on the PCB board. Light emitted from the LED chips may irradiate the LCD display panel to achieve the backlight function of lighting up the LCD display apparatus.

FIG. 1 illustrates a schematic view of a prior art LED backlight emitting light. As shown in FIG. 1, in the direct-lit LED backlight 400, certain gaps may exist between adjacent LED chips 401. When the LED backlight 400 emits light, gap regions may appear darker due to the absence of light illumination. As such, the LED backlight 400 may exhibit the so-called "*Gypsophila*" symptom. That is, brightness of the LED backlight 400 is strong at the positions of the LED chips 401 and is weak in the gap regions between adjacent LED chips 401. When the LED chips 401 do not emit light, the entire LED backlight may appear dark. When the LED chips 401 emit light, the positions at and around the LED chips 401 are illuminated and look bright while the regions between adjacent LED chips 401 are not illuminated and look dark. This is the so-called "*Gypsophila*" symptom. The entire LED backlight 400 does not emit light uniformly.

In view of the above, the present disclosure provides a LED backlight, a backlight module, and a display apparatus. Prism-shaped light guide structures may be configured between adjacent LED chips. At least a portion of light emitted from a second light emitting surface of the LED chips may be guided by the prism-shaped light guide structures to exit from a light emitting surface of the LED backlight. Thus, the light utilization of the LED backlight may be increased, the light uniformity may be improved, and the so-called "*Gypsophila*" symptom may be less likely to occur at the LED backlight.

In one embodiment, the LED backlight may include a substrate, a plurality of LED chips, a plurality of prism-shaped light guide structures, and a first medium. The plurality of LED chips may be configured on a first surface of the substrate and may be electrically connected to the substrate. Each LED chip may include a first light emitting surface and at least a second light emitting surface. The first light emitting surface may be disposed on a side of the LED chip facing away from the substrate. A plane where the second light emitting surface is located may intersect with the substrate. The prism-shaped light guide structures may be configured between adjacent LED chips and within a space defined by two adjacent second light emitting surfaces of two adjacent LED chips. The index of refraction of the prism-shaped light guide structure may be n1. The first medium may be configured between the LED chips and the prism-shaped light guide structures. The index of refraction of the first medium may be n2, where n1>n2. At least a portion of light emitted from the second light emitting surface of the LED chips may be guided by the prism-shaped light guide to exit from the light emitting surface of the LED backlight, which is parallel with a plane where the first light emitting surface is located.

The LED backlight may be described in more details with reference to the accompanying drawings.

Figure 2:
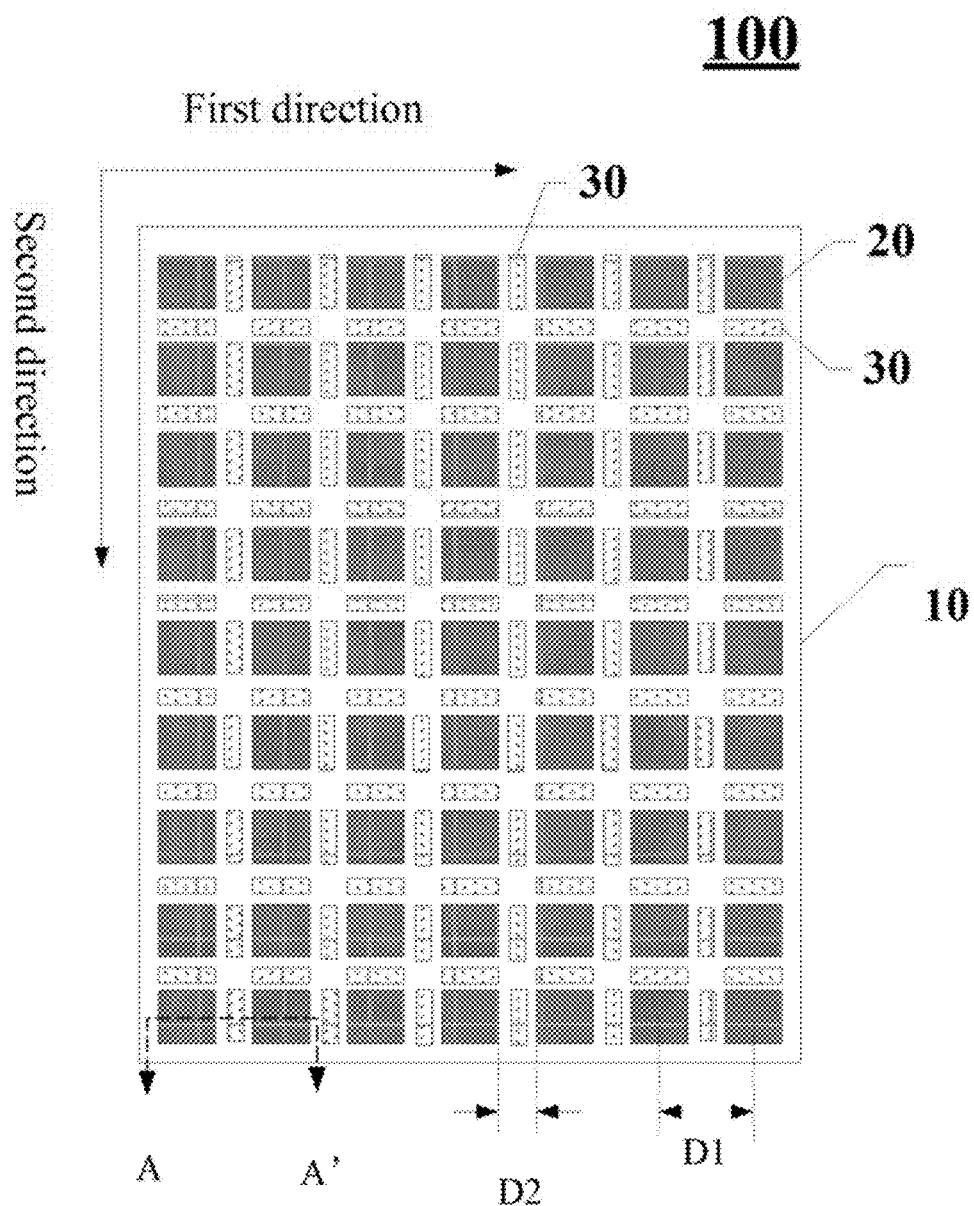
FIG. 2 illustrates a top view of an exemplary LED backlight according to disclosed embodiments.
Figure 3:
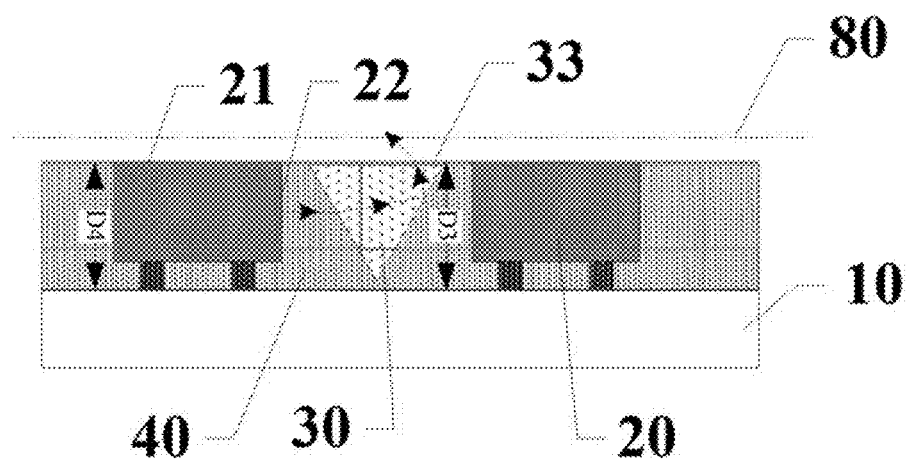
FIG. 3 illustrates a cross-sectional view of an exemplary LED backlight along the AA' line in FIG. 2.

FIG. 2 illustrates a top view of an exemplary LED backlight according to disclosed embodiments. FIG. 3 illustrates a cross-sectional view of an exemplary LED backlight along the AA' line in FIG. 2. As shown in FIG. 2 and FIG. 3, the LED backlight 100 may include a substrate 10, a plurality of LED chips 20 disposed on the substrate 10 and electrically connected to the substrate 10, and a plurality of prism-shaped light guide structures 30 disposed between adjacent LED chips 20. In one embodiment, the substrate 10 includes circuits to supply electric power to the electrically connected LED chips 20. For example, the substrate 10 may be a flexible printed circuit (FPC) substrate or a PCB substrate.

In one embodiment, the LED chip 20 may have a cuboid structure, a cube structure, a cuboid-like structure, or a cube-like structure. The top surface of the LED chip 20 may be a first light emitting surface 21. Each of the four side surfaces may be a second light emitting surface 22. The prism-shaped light guide structure 30 may be disposed in a space defined by two adjacent second light emitting surfaces 22 of two adjacent LED chips 20 and the substrate 10. In addition to the prism-shaped light guide structure 30, the space may also accommodate a first medium 40 disposed between the second light emitting surface 22 and the prism-shaped light guide structure 30. The index of refraction of the prism-shaped light guide structure 30 may be n1. The index of refraction of the first medium 40 may be n2, where n1>n2.

In this way, at least a portion of the light emitted from the second light-emitting surface 22 of the LED chip 20 may be guided by the prism-shaped light guide structure 30 to exit from a light emitting surface 80 of the LED backlight 100. It should be noted that the light emitting surface 80 of the LED backlight 100 is located in a plane parallel with the substrate 10, for example, a plane as indicated by a dashed line in FIG. 3. The light emitting surface 80 of the LED backlight 100 may also be parallel with the first light emitting surface 21 of each LED chip 20, and may be disposed on a side of the first light emitting surface 21 of each LED chip 20 away from the substrate 10.

Without such structures, the portion of light emitted from the sides of the LED chips 20 may be unable to exit from the light emitting surface 80 of the LED backlight 100. After the prism-shaped light guide structures 30 are introduced in the present disclosure, the portion of light emitted from the sides (i.e., the second light emitting surfaces 22) of the LED chips 20 may be effectively utilized. Thus, the effective utilization rate of the light emitted from the LED chips may be increased. At the same time, the issue of insufficient brightness in the gap regions between adjacent LED chips 20 may be mitigated. The light emitted from the LED backlight 100 may become more uniform. The so-called "*Gypsophila*" symptom of the LED backlight 100 may be substantially minimized. When the disclosed LED backlight 100 is applied to any display apparatus, the display effectiveness of such display apparatus may be improved.

It should be noted that, the relative position relationship between the LED chips 20 and the prism-shaped light guide structures 30 on the substrate 10 as shown in FIG. 2 and FIG. 3 is for illustrative purposes and does not represent the actual dimensions and quantities of the LED chips 20 and the prism-shaped light guide structures 30. In addition, the LED chips 20 may be arranged on the substrate 10 in a way different from what is shown in FIG. 2. In other embodiments of the present disclosure, different arrangements may be utilized. The present disclosure does not limit the arrangement of the LED chips 20.

In one embodiment, referring to FIG. 2, the LED chips 20 may be Mini LED chips 20. A distance between the centers of two adjacent LED chips 20 may be D1, and 1 mm≤D1≤5 mm.

In particular, the LED chips 20 of the backlight source 100 are Mini LED chips 20. The Mini LED chips 20 may be arranged in an array on the substrate 10 to form a direct-lit LED backlight 100. Mini LED is also known as millimeter light emitting diode, referring to LED with a die size between approximately 100 μm and 1,000 μm. The LED backlight 100 formed by Mini LED chips 20 may have high yield and characteristics desired for being cut into irregular shapes. When combined with flexible substrate, the LED backlight 100 may be formed into a highly curved backlight source with superior color rendering. When the LED backlight 100 is integrated into a display panel, such display panel may provide a finer high dynamic range (HDR) partition.

In one embodiment, referring to FIG. 2, in the LED backlight 100, a distance between two adjacent second light emitting surfaces 22 of any two adjacent LED chips 20 may be D2, and 0.5 mm≤D2≤4.5 mm.

In general, Mini LED may have a cuboid structure. The dimensions of the length and width of the Mini LED may be approximately between 0.25 mm and 0.5 mm. The height may be approximately 0.1 mm. The Mini LED may emit light from five surfaces. The first light emitting surface 21 may be a surface defined by the length and the width away from the substrate 10. The second light emitting surface 22 may be any of the four surfaces defined by the length and the height or by the width and the height. The distance between two adjacent second light emitting surfaces 22 may be D2, and 0.5 mm≤D2≤4.5 mm. In this way, adjacent Mini LED chips 20 may be separated by a certain gap to reduce the chance that the light emitted from adjacent Mini LED chips 20 too close to each other may overlap with each other and the LED backlight 100 may not emit light uniformly. The LED backlight 100 may emit light more uniformly. In addition, when the distance D2 between two adjacent second light emitting surfaces 22 is less than 2.5 mm, the number of Mini LED chips packed in a same unit area may be sufficient to maintain a desired overall brightness of the LED backlight 100.

In one embodiment, referring to FIG. 3, in the LED backlight 100, the first light emitting surface 21 may be parallel with the substrate 10. The prism-shaped light guide structures 30 may have a third light emitting surface 33. The third light emitting surface 33 may be parallel with the substrate 10.

In general, in the direct-lit LED backlight 100, the light emitting surface 80 of the LED backlight 100 may be parallel with the substrate 10. When the first light emitting surface 21 of the LED backlight 100 and the third light emitting surface 33 of the prism-shaped light guide structure 30 are configured to be parallel with the substrate 10, the first light emitting surface 21 of the LED chips 20 and the third light emitting surface 33 of the prism-shaped light guide structures 30 may be parallel with the light emitting surface 80 of the LED backlight 100, respectively. Thus, the light emitted from the first light emitting surface 21 of the LED chips 20 and the light emitted from the third light emitting surface 33 of the prism-shaped light guide structures 30 may exit from the light emitting surface 80 of the LED backlight 100, and the utilization rate of light emitted from the LED backlight 100 may be improved.

In one embodiment, a distance D3 between the third light emitting surface 33 of the prism-shaped light guide structures 30 and the substrate 10 may be greater than or equal to a distance D4 between the first light emitting surface 21 of the LED chips 20 and the substrate 10. Specifically, as shown in FIG. 3, the distance D3 between the third light emitting surface 33 of the prism-shaped light guide structures 30 and the substrate 10 may be equal to the distance D4 between the first light emitting surface 21 of the LED chips 20 and the substrate 10.

Figure 4:
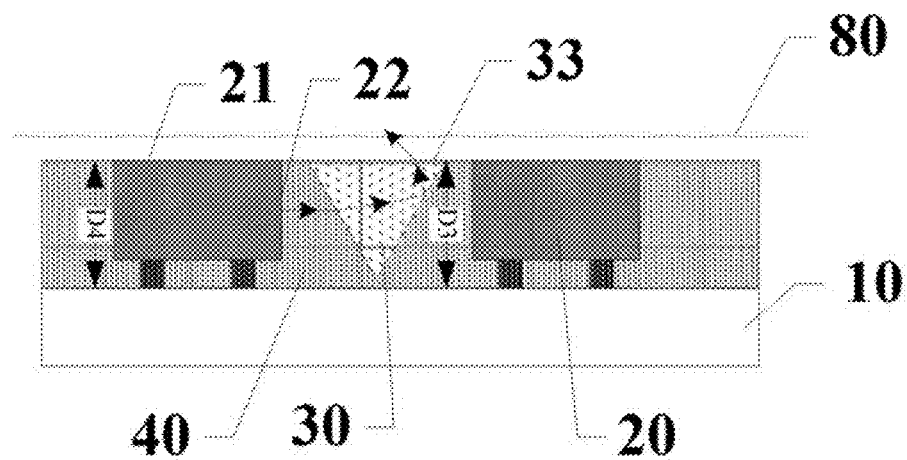
FIG. 4 illustrates a cross-sectional view of another exemplary LED backlight along the AA' line in FIG. 2.

FIG. 4 illustrates a cross-sectional view of another exemplary LED backlight along the AA' line in FIG. 2. In one embodiment, as shown in FIG. 4, the distance D3 between the third light emitting surface 33 of the prism-shaped light guide structures 30 and the substrate 10 may be greater than the distance D4 between the first light emitting surface 21 of the LED chips 20 and the substrate 10. Referring to FIG. 3 and FIG. 4, after the light emitted from the second light emitting surface 22 of the LED chips 20 passes through the prism-shaped light guide structures 30, at least a portion of the light may exit from the third light emitting surface 33, and then may exit from the light emitting surface 80 of the LED backlight 100. When the distance D3 between the third light emitting surface 33 of the prism-shaped light guide structures 30 and the substrate 10 is designed to be greater than or equal to the distance D4 between the first light emitting surface 21 of the LED chips 20 and the substrate 10, the light emitted from the third light emitting surface 33 of the prism-shaped light guide structures 30 may be ensured to exit the light emitting surface 80 of the LED backlight 100, and the utilization rate of light emitted from the LED backlight 100 may be further improved.

Figure 5:
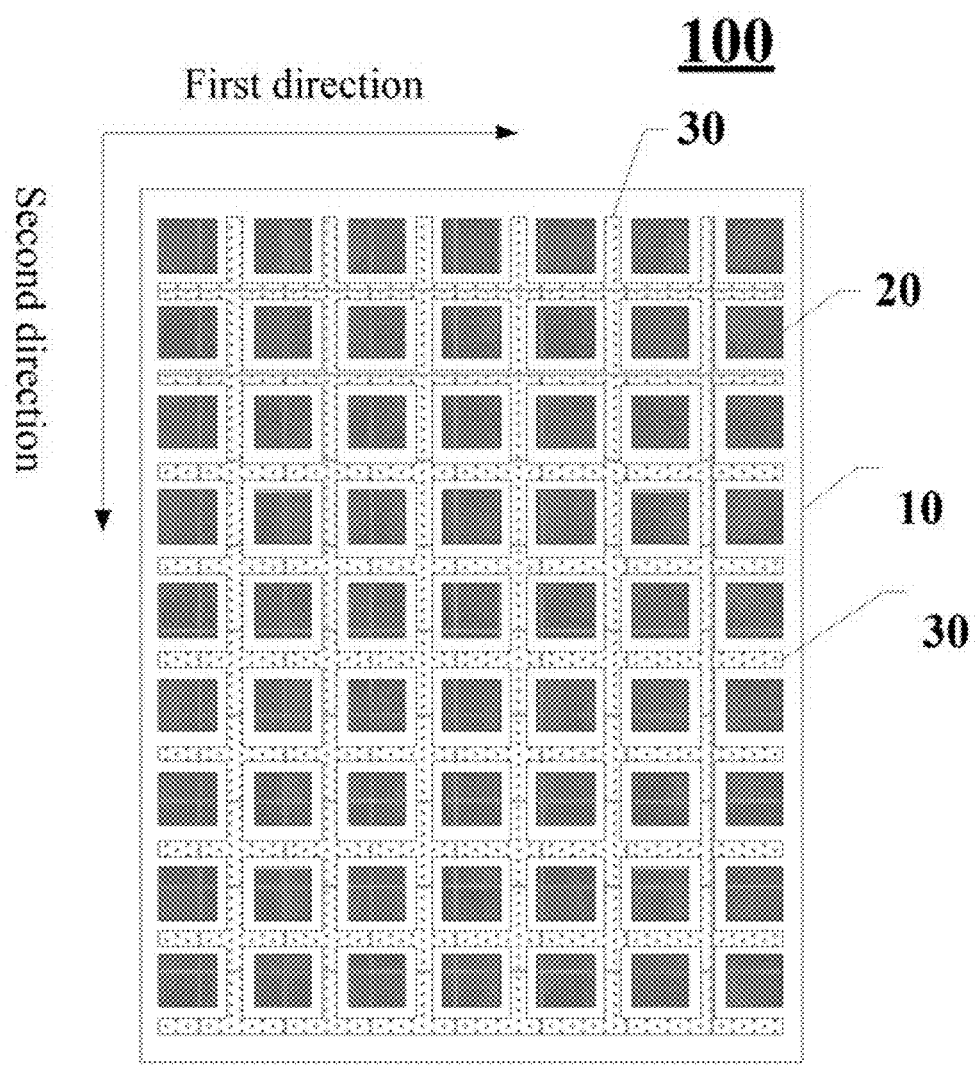
FIG. 5 illustrates a top view of another exemplary LED backlight according to disclosed embodiments.

FIG. 5 illustrates a top view of another exemplary LED backlight according to disclosed embodiments. In one embodiment, as shown in FIG. 5, in the LED backlight 100, the LED chips 20 may be arranged in an array on the first surface of the substrate 10 in a first direction and a second direction. The prism-shaped light guide structures 30 between two adjacent columns of the LED chips 20 may be integrally formed and may extend in the second direction. The prism-shaped light guide structures 30 between two adjacent rows of the LED chips 20 may be integrally formed and may extend in the first direction.

In particular, as shown in FIG. 5, the LED backlight module 100 may be applied to a direct-lit backlight module, capable of providing a surface light source to a display panel. In one embodiment, the LED chips 20 may be arranged in an array. When the prism-shaped light guide structures 30 are integrally formed between any two adjacent columns of the LED chips 20 and between any two adjacent rows of the LED chips 20, the prism-shaped light guide structures 30 may be no longer individually formed between any two adjacent LED chips 20. Thus, the fabrication process for the prism-shaped light guide structures 30 may be substantially simplified, and the production efficiency of the LED backlight 100 may be improved.

The integral formation according to the present disclosure may refer to forming a certain film material into a specific shape. For example, a liquid film material may be placed in a certain mold and may be thermally cured into a specific shape. As shown in FIG. 5, the prism-shaped light guide structures 30 arranged along the row direction and the column direction may be integrally formed into a one-piece grid-shaped structure. As such, the prism-shaped light guide structures 30 may be integrally formed. The fabrication of the entire prism-shaped light guide structures 30 may be completed in a single step of production process. Thus, the production efficiency of the LED backlight 100 may be improved.

Figure 6:
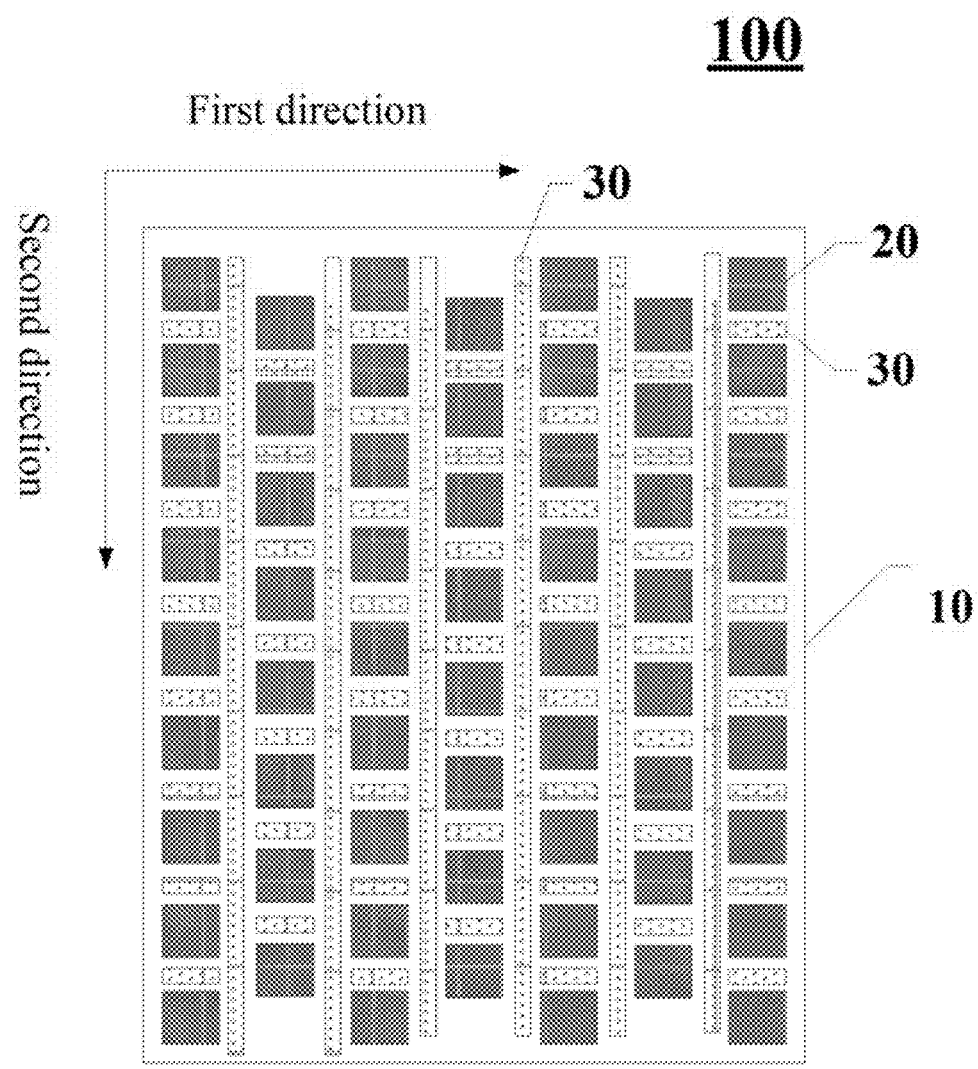
FIG. 6 illustrates a top view of another exemplary LED backlight according to disclosed embodiments.

It should be noted that the LED chips 20 may be arranged in an array in the LED backlight 100 shown in FIG. 2 and FIG. 5. In addition to the array arrangement, the LED chips 20 may be arranged in a staggered form. FIG. 6 illustrates a top view of another exemplary LED backlight according to disclosed embodiments. In one embodiment, as shown in FIG. 6, the prism-shaped light guide structures 30 may be integrally formed between any two adjacent columns of the LED chips 20 and may extend in the second direction. The prism-shaped light guide structures 30 may be individually formed between any two adjacent LED chips 20 arranged along the second direction. Obviously, the prism-shaped light guide structures 30 may be individually formed between any two adjacent LED chips 20, which is not limited by the present disclosure. Moreover, the non-array arrangement shown in FIG. 6 may be for illustrative purposes. In addition to this arrangement, in other embodiments, the LED chips 20 may be arranged in other staggered forms. Based on different arrangements of the LED chips 20, the prism-shaped light guide structures 30 may be configured accordingly, which is not limited by the present disclosure.

In one embodiment, referring to FIG. 3 and FIG. 4, in the LED backlight 100 provided by the embodiments of the present disclosure, the prism-shaped light guide structure 30 may be a triangular prism. A first vertical cross-section of the prism-shaped light guide structure 30 may be an isosceles triangle. A plane where the bottom side of the isosceles triangle is located may be the third light emitting surface 33. The apex angle of the isosceles triangle may be located between the third light emitting surface 33 and the substrate 10. The first vertical cross-section may be perpendicular to the substrate 10 and may be parallel with the first direction or the second direction.

Figure 7:
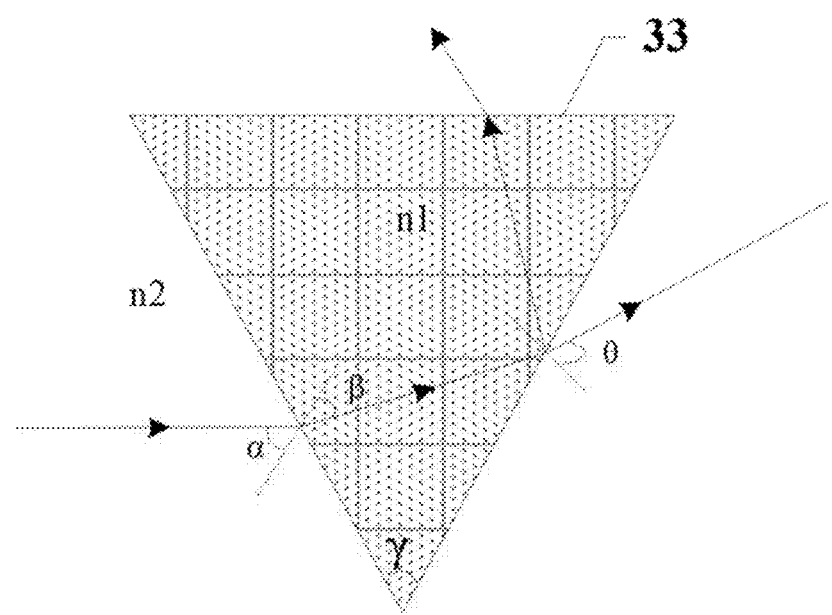
FIG. 7 illustrates an optical path diagram of an exemplary prism-shaped light guide structure according to disclosed embodiments.

FIG. 7 illustrates an optical path diagram of an exemplary prism-shaped light guide structure according to disclosed embodiments. As shown in FIG. 7, when the first vertical cross-section of the prism-shaped light guide structure 30 is an isosceles triangle, at least a portion of the light emitted from the second light emitting surface 22 (i.e., the side surface) of the LED chips 22 may be guided by the prism-shaped light guide structures 30 to the third light emitting surface 33 to exit from the regions between adjacent LED chips 20. In this way, the utilization rate of light emitted from the second light emitting surface 22 of the LED chips 20 may be substantially increased. The brightness in the regions between adjacent LED chips 20 may be increased. And the so-called "*Gypsophila*" symptom may be minimized.

In one embodiment, referring to FIG. 7, the first vertical cross-section of the prism-shaped light guide structure 30 may be an isosceles triangle. The apex angle of the isosceles triangle is γ, and $\sin \gamma \sqrt{(n1/n2)^2 - \sin^2(\gamma/2)} - \cos \gamma \sin(\gamma/2) = 1$.

In particular, according to the law of refraction, $\sin \alpha \cdot n2 = \sin \beta \cdot n1$. That is, $\sin(\gamma - /3) \cdot n1 = \sin \theta \cdot n2$. Then, $\sin \beta = \sin \alpha \cdot n2/n1$. Expanding $\sin(\gamma - \beta) \cdot n1 = \sin \theta \cdot n2$ to obtain $(\sin \gamma \cdot \cos \beta - \cos \gamma \cdot \sin \beta) \cdot n1 = \sin \theta \cdot n2$. That is, $\{\sin \gamma \cdot \sqrt{1 - (\sin \alpha \cdot n2/n1)^2} - \cos \gamma (\sin \alpha \cdot n2/n1)\} \cdot n1 = \sin \theta \cdot n2$.

The light emitted from the second light emitting surface 22 of the LED chips 20 may be primarily a horizontal light, that is, $\alpha = \gamma/2$. Then, $\sin \gamma \cdot \sqrt{(n1/n2)^2 - \sin^2(\gamma/2)} - \cos \gamma \cdot \sin(\gamma/2) = \sin \theta$. When $\theta = 90°$, total reflection may occur. Thus, $\sin \gamma \cdot \sqrt{(n1/n2)^2 - \sin^2(\gamma/2)} - \cos \gamma \cdot \sin(\gamma/2) = 1$.

In other words, when the apex angle α of the prism-shaped light guide structure 30 satisfies the above equation, total reflection of the light emitted from the second light emitting surface 22 of the LED chips 20 may occur in the prism-shaped light guide structure 30. As such, the light emitted from the second light emitting surface 22 of the LED chips 20 may be ensured to exit from the third light emitting surface 33 of the prism-shaped light guide structure 30. The chance of the light reflected by a surface other than the third light emitting surface 33 to exit may be reduced. Thus, the utilization rate of light emitted from the second light emitting surface 22 of the LED chips 20 may be substantially increased. The brightness in the regions between adjacent LED chips 20 may be increased. And the so-called "*Gypsophila*" symptom may be minimized.

In one embodiment, in the LED backlight 100 according to the present disclosure, one or two prism-shaped light guide structures 30 may be configured between any two adjacent LED chips 20. In particular, as shown in FIG. 3 and FIG. 4, only one prism-shaped light guide structure 30 may be configured between any two adjacent LED chips 20.

Figure 8:
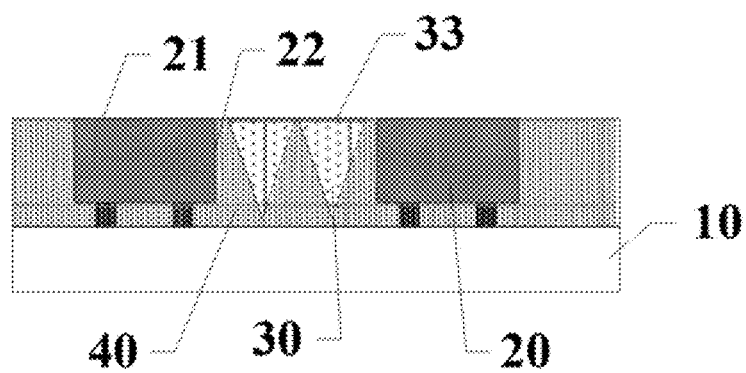
FIG. 8 illustrates a cross-sectional view of another exemplary LED backlight along the AA' line in FIG. 2.

FIG. 8 illustrates a cross-sectional view of another exemplary LED backlight along the AA' line in FIG. 2. In one embodiment, as shown in FIG. 8, two prism-shaped light guide structures 30 may be configured between two adjacent LED chips 20. The two prism-shaped light guide structures 30 may guide the light emitted from the second light emitting surface 22 of the adjacent LED chips 20 respectively to the third light emitting surface 33 to exit from the light emitting surface of the LED backlight 100. The brightness in the regions between adjacent LED chips 20 may be increased. The so-called "*Gypsophila*" symptom may be minimized. Obviously, in addition to the above embodiments, a plurality of prism-shaped light guide structures 30 may be configured between any two adjacent LED chips 20, which is not limited by the present disclosure.

Figure 9:
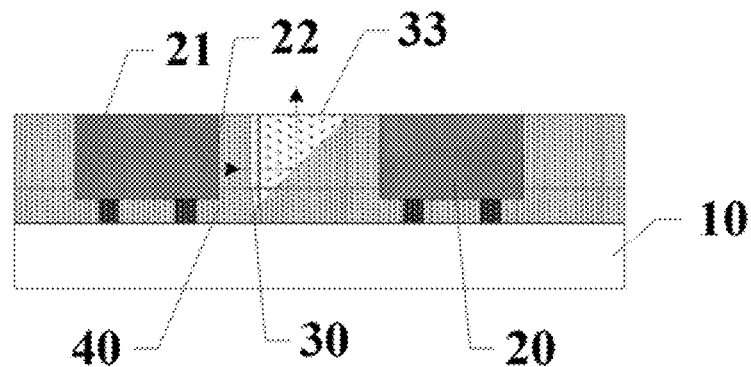
FIG. 9 illustrates a cross-sectional view of another exemplary LED backlight along the AA' line in FIG. 2.

FIG. 9 illustrates a cross-sectional view of another exemplary LED backlight along the AA' line in FIG. 2. In one embodiment, as shown in FIG. 9, the prism-shaped light guide structure 30 may be a triangular prism. The first vertical cross-section of the prism-shaped light guide structures 30 may be an isosceles right triangle. A plane where a first leg of the isosceles right triangle is located may be the third light emitting surface 33. A plane where a second leg of the isosceles right triangle is located may be a light incident surface for receiving the light emitted from the second light emitting surface 22 of the LED chip 20 adjacent to the second leg. The first vertical cross-section may be perpendicular to the substrate 10 and may be parallel with the first direction or the second direction.

Figure 10:
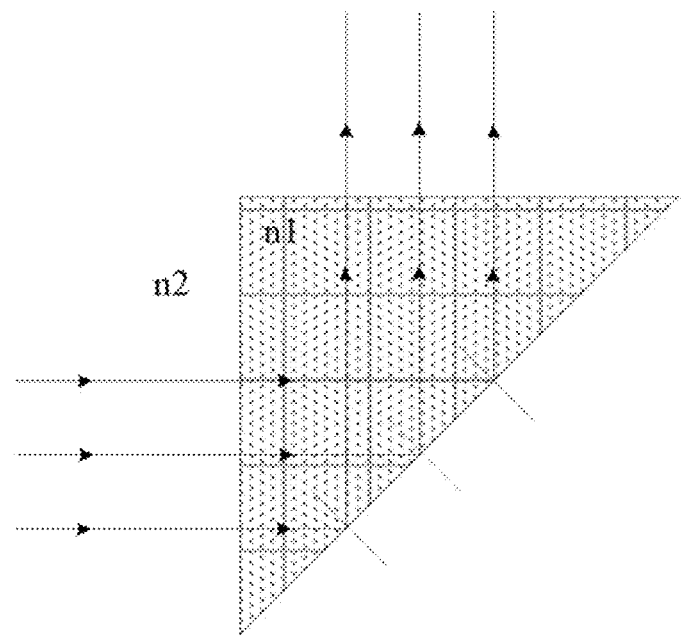
FIG. 10 illustrates an optical path diagram of another exemplary prism-shaped light guide structure according to disclosed embodiments.

FIG. 10 illustrates an optical path diagram of another exemplary prism-shaped light guide structure according to disclosed embodiments. In one embodiment, referring to FIG. 9 and FIG. 10, the prism-shaped light guide structure 30 disposed between adjacent LED chips 20 may have the first vertical cross-section in the shape of an isosceles right triangle. The light emitted from the second light emitting surface 22 of the LED chip 20 may pass through the plane where the first leg of the isosceles right triangle is located to enter the prism-shaped light guide structure 30. Guided by the prism-shaped light guide structure 30, the light may exit from the plane (i.e., the third light emitting surface 33) where the second leg of the isosceles right triangle is located. Thus, the utilization rate of the light emitted from the second light emitting surface 22 of the LED chip may be similarly increased. The brightness in the regions between adjacent LED chips 20 may be similarly increased. The so-called "*Gypsophila*" symptom may be minimized.

In one embodiment, referring to FIG. 9 and FIG. 10, when the first vertical cross-section of the prism-shaped light guide structure 30 is an isosceles right triangle, n1/n2≥1.414. Referring to FIG. 10, according to the law of refraction, sin(incident angle)·n1=sin(refraction angle)·n2.

When the refraction angle≥90°, total reflection will occur, and the corresponding incident angle is C. Therefore, sin C=n2/n1. In the case of the isosceles right triangle, C=45°. Therefore, n2/n1=sin 45°=1/1.414. Therefore, when n1/n2≥1.414, the light emitted from the second light emitting surface 22 of the LED chip 20 may be able to reflect totally after entering the prism-shaped light guide structure 30. More light may exit in the regions between adjacent LED chips 20. Thus, the utilization rate of the light emitted from the second light emitting surface 22 of the LED chips 20 may be increased. The brightness in the regions between adjacent LED chips 20 may be increased. The so-called "*Gypsophila*" symptom may be minimized.

It should be noted that only one prism-shape light guide structure 30 that has a cross-section in the shape of an isosceles right triangle is configured between adjacent LED chips shown in FIG. 9. At the viewing angle shown in FIG. 9, the prism-shaped light guide structure 30 may guide the light emitted from the second light emitting surface 22 of the LED chip 20 located on the left side to the light emitting surface of the LED backlight 100. Thus, the method may guide a portion of the light emitted from the second light emitting surface 22 of the LED chip 20 to the regions between adjacent LED chips 20. Thus, the brightness in the regions between adjacent LED chips 20 may be increased. The so-called "*Gypsophila*" symptom may be minimized.

Figure 11:
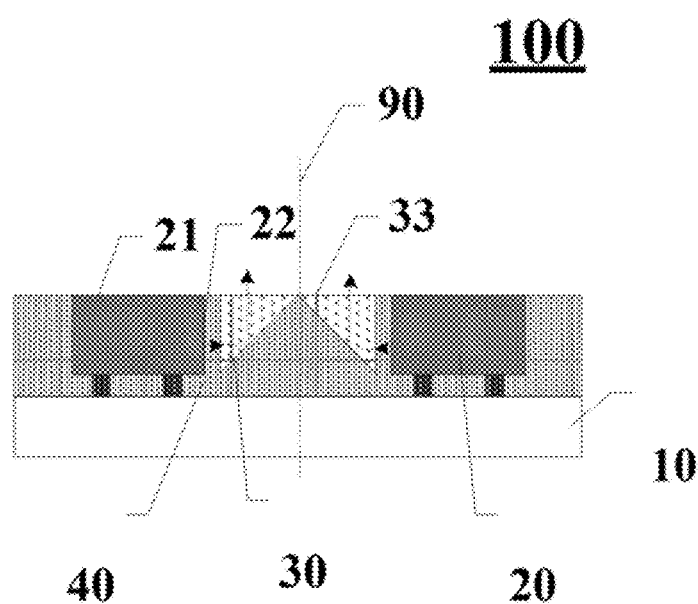
FIG. 11 illustrates a cross-sectional view of another exemplary LED backlight along the AA' line in FIG. 2.

FIG. 11 illustrates a cross-sectional view of another exemplary LED backlight along the AA' line in FIG. 2. In one embodiment, as shown in FIG. 11, two prism-shaped light guide structure 30 may be configured between any two adjacent LED chips 20. The two prism-shaped light guide structures 30 may be symmetrical with respect to the first vertical cross-section.

In particular, as shown in FIG. 11, two prism-shaped light guide structures 30 that have the first vertical cross-section in the shape of an isosceles right triangle may be configured between two adjacent LED chips 20. The two prism-shaped light guide structures 30 may be symmetrical with respect to the first vertical cross-section. The first vertical cross-section may be referred to the cross-section indicated by the dashed line 90 in FIG. 11. The first vertical cross-section may be perpendicular to the first direction. At the viewing angle shown in FIG. 11, the prism-shaped light guide structure 30 located on the left side may guide the light emitted from the second light emitting surface 22 of the LED chip 20 on the left side to the third light emitting surface 33. The prism-shaped light guide structure 30 located on the right side may guide the light emitted from the second light emitting surface 22 of the LED chip 20 on the right side to the third light emitting surface 33.

In this way, the light emitted from the second light emitting surface 22 of the two adjacent LED chips 20 may be effectively guided. Thus, the method of configuring two prism-shaped light guide structures 30 between the two adjacent LED chips 20 may help further increasing the amount of light emitted from the region between two adjacent LED chips 20, increasing the brightness in the region between two adjacent LED chips, and minimizing the so-called "*Gypsophila*" symptom. In addition, the two prism-shaped light guide structures 30 may be arranged symmetrically. At the viewing angle shown in FIG. 11, the amount of light guided by the prism-shaped light guide structure 30 on the left side and exited from the third light emitting surface 33 thereof may be similar to the amount of light guided by the prism-shaped light guide structure 30 on the right side and exited from the third light emitting surface 33 thereof. As such, the brightness uniformity between adjacent LED chips 20 may be ensured, and the uniformity of the entire LED backlight 100 may be improved.

Figure 12:
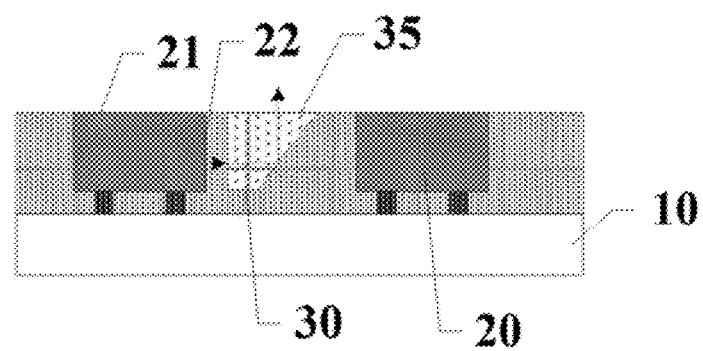
FIG. 12 illustrates a cross-sectional view of another exemplary LED backlight along the AA' line in FIG. 2 when the prism-shaped light guide structure is a quadrangular prism.

It should be noted that, for illustrative purposes, a triangular prism may be used in the above embodiments as the prism-shaped light guide structures 30. In addition, a quadrangular prism or other prism-like structures may be used. The present disclosure does not limit the type of prism used as the prism-shaped light guide structures 20. FIG. 12 illustrates a cross-sectional view of another exemplary LED backlight along the AA' line in FIG. 2 when the prism-shaped light guide structure is a quadrangular prism.

In one embodiment, as shown in FIG. 12, the prism-shaped light guide structure 30 may be a quadrangular prism. The quadrangular prism may have a light emitting surface 35 parallel with the substrate 10. The light emitted from the second light emitting surface 22 of the LED chips 20 may be guided by the quadrangular prism and may exit from the light emitting surface 35 of the quadrangular prism. Similarly, the prism-shaped light guide structure 30 may guide a portion of the light emitted from the second light emitting surface 22 of the LED chips 20 to the regions between adjacent LED chips 20. Thus, the brightness in the regions between adjacent LED chips 20 may be increased. The so-called "*Gypsophila*" symptom that often occurs in the prior art may be minimized. The quadrangular prism shown in FIG. 12 may be one of the quadrangular prism structures. In other embodiments, the quadrangular prism may have other structures, which are not limited by the present disclosure.

Figure 13:
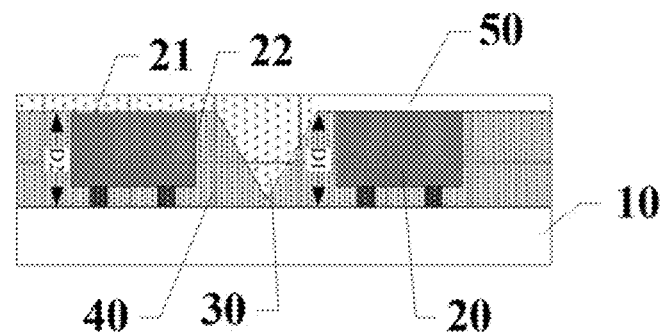
FIG. 13 illustrates a cross-sectional view of an exemplary light guide substrate of an exemplary LED backlight according to disclosed embodiments.
Figure 14:
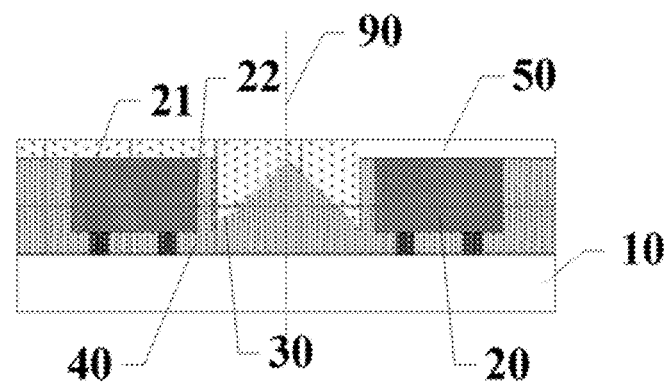
FIG. 14 illustrates a cross-sectional view of another exemplary light guide substrate of an exemplary LED backlight according to disclosed embodiments.

FIG. 13 illustrates a cross-sectional view of an exemplary light guide substrate of an exemplary LED backlight according to disclosed embodiments. FIG. 14 illustrates a cross-sectional view of another exemplary light guide substrate of an exemplary LED backlight according to disclosed embodiments. In one embodiment, as shown in FIG. 13 and FIG. 14, the LED backlight 100 may further include a light guide substrate 50. The light guide substrate 50 may be disposed on a side of the LED chips 20 away from the substrate 10. The prism-shaped light guide structures 30 may be disposed on a side of the light guide substrate 50 adjacent to the substrate 10, and the light guide substrate 50 and the prism-shaped light guide structures may be integrally formed.

In particular, referring to FIG. 13 and FIG. 14, the light guide substrate 50 integrally formed with the prism-shaped light guide structures 30 are introduced in the embodiments. After the integral structure of the combined light guide substrate 50 and the prism-shaped light guide structures 30 is formed separately, the integral structure may be placed upside down on the LED chips 20 so that the prism-shaped light guide structures 30 may be disposed between adjacent LED chips 20, the light guide substrate 50 may contact a surface of the LED chips 20 away from the substrate 10, and the LED chips 20 may provide the support for the light guide substrate 50. In some embodiments, the integral formation of the light guide substrate 50 and the prism-shaped light guide structures 30 may not only streamline the production process of the light guide substrate 50 and the prism-shaped light guide structures 30, but also simplify the assembly process of the prism-shaped light guide structures 30. Thus, the production efficiency of the LED backlight 100 may be improved.

In display technologies, the LED backlight 100 may often be required to emit white light. However, the current LED chips 20 cannot emit white light by themselves. Thus, it may be necessary to apply a fluorescent film or a phosphor powder to the LED chips 20. The fluorescent film or the phosphor powder may make the entire LED backlight 100 emit white light.

Figure 15:
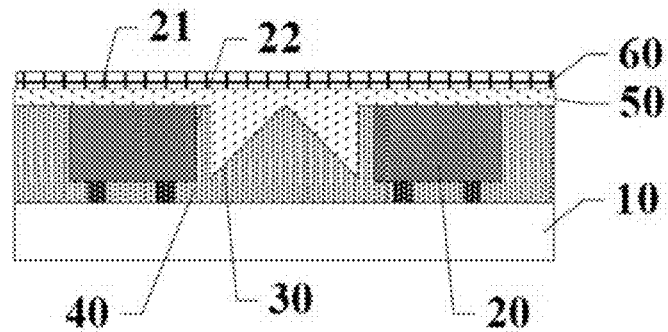
FIG. 15 illustrates a cross-sectional view of another exemplary light guide substrate of an exemplary LED backlight according to disclosed embodiments.

FIG. 15 illustrates a cross-sectional view of another exemplary light guide substrate of an exemplary LED backlight according to disclosed embodiments. In one embodiment, the LED backlight 100 may further include a fluorescent film 60. The fluorescent film 60 may be disposed on a surface of the light guide substrate 50 away from the substrate 10. In particular, as shown in FIG. 15, the fluorescent film 60 may be applied to the surface of the light guide substrate 50 away from the substrate 10. After being effected by the fluorescent film 60, the LED chips 20 may emit white light, thereby satisfying the requirement of emitting white light.

Figure 16:
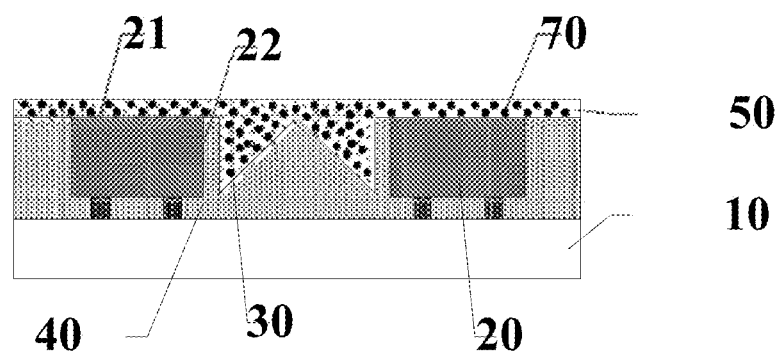
FIG. 16 illustrates a cross-sectional view of another exemplary light guide substrate of an exemplary LED backlight according to disclosed embodiments.

FIG. 16 illustrates a cross-sectional view of another exemplary light guide substrate of an exemplary LED backlight according to disclosed embodiments. In one embodiment, as shown in FIG. 16, the LED backlight 100 may further include a fluorescent powder 70. The fluorescent powder 70 may be at least doped into the light guide substrate 50. In the fabrication process, the phosphor powder 70 may be doped into the light guide substrate 50 at the same the light guide substrate 50 is formed. As shown in FIG. 16, when the light guide substrate 50 and the prism-shaped light guide structures 30 are integrally formed, the phosphor powder 70 may be doped into the light guide substrate 50 and the prism-shaped light guide structures 30. The black dots in FIG. 16 may represent the doped phosphor powder 70. After passing through the light guide substrate 50, the light emitted from the LED chips 20 may be converted into white light after being effected by the phosphor powder 70. For example, the LED chips 20 emitting blue light may be matched by a yellow phosphor powder to eventually emit white light. In this way, no fluorescent film 60 may be separately added to the LED backlight 100. Thus, the overall thickness of the LED backlight 100 may be reduced.

Figure 17:
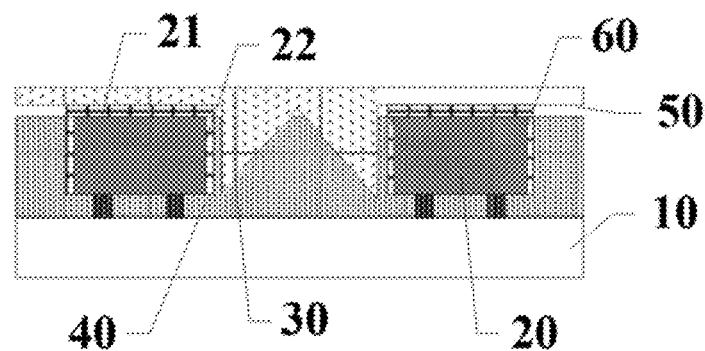
FIG. 17 illustrates a cross-sectional view of another exemplary light guide substrate of an exemplary LED backlight according to disclosed embodiments.

FIG. 17 illustrates a cross-sectional view of another exemplary light guide substrate of an exemplary LED backlight according to disclosed embodiments. In one embodiment, as shown in FIG. 17, the LED backlight 100 may further include a fluorescent film 60. The fluorescent film 60 may be disposed on the first light emitting surface 21 and the second light emitting surface 22 of each LED chip 20. The light guide substrate 50 may be disposed on a side of the fluorescent film 60 disposed on the first light emitting surface 21 of each LED chip 20 away from the substrate 10. In particular, as shown in FIG. 17, the first light emitting surface 21 and the second light emitting surface 22 of each LED chip 20 may be coated by the fluorescent film 60. Effected by the fluorescent film 60, the light emitted from the first light emitting surface 21 and the second light emitting surface 22 of each LED chip 20 may be converted the white light required by the LED backlight 100.

In one embodiment, in the LED backlight 100 provided by the present disclosure, the prism-shaped light guide structures 30 may be made of a light guide glue. The light guide glue may be cured to form the corresponding prism-shaped light guide structures 30.

In one embodiment, the light guide glue may include one of silicone, photosensitive glue, and thermally cured glue. When the light guide glue is in the form of silicone, the curing method may be injection molding. The prism-shaped light guide structures 30 may be formed by curing liquid silicone filled in a certain mold. When the light guide glue is in the form of photosensitive glue, the curing method may be ultra violet (UV) light curing. The prism-shaped light guide structures 30 may be formed by curing the photosensitive glue filled in a certain mold through a UV light. When the light guide glue is in the form of thermally cured glue, the curing method may be hot pressing. The prism-shaped light guide structures 30 may be formed by hot pressing a semi-solid film formed by the thermally cured glue.

In one embodiment, in the LED backlight 100 provided by the present disclosure, the first medium 40 may be air or silicone. For example, in FIG. 3, FIG. 4, FIG. 8, FIG. 9, and FIG. 11, the prism-shaped light guide structures 30 may require a medium support. Thus, the first medium 40 may be silicone in these embodiments. In the embodiments shown in FIG. 13 and FIG. 14, the light guide substrate 50 are introduced. The prism-shaped light guide structures 30 may be fastened to the light guide substrate 50. The light guide substrate 50 may provide an upward support to the prism-shaped light guide structures 30. Thus, the first medium 40 may be air or silicone.

Figure 18:
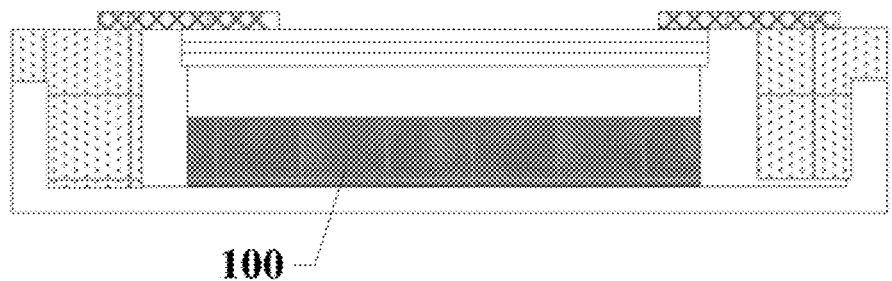
FIG. 18 illustrates a cross-sectional view of an exemplary LED backlight module according to disclosed embodiments.

Based on the same inventive concept, the present disclosure also provides a backlight module 200. FIG. 18 illustrates a cross-sectional view of an exemplary LED backlight module according to disclosed embodiments. In one embodiment, as shown in FIG. 18, the backlight module 200 may include an LED backlight 100. The LED backlight 100 may be any of the LED backlights 100 provided in the embodiments of the present disclosure. The backlight module 200 may have the same features and functions as the LED backlight 100, which may be referred to the embodiments previously described for the LED backlight 100 and will not be repeated herein.

Figure 19:
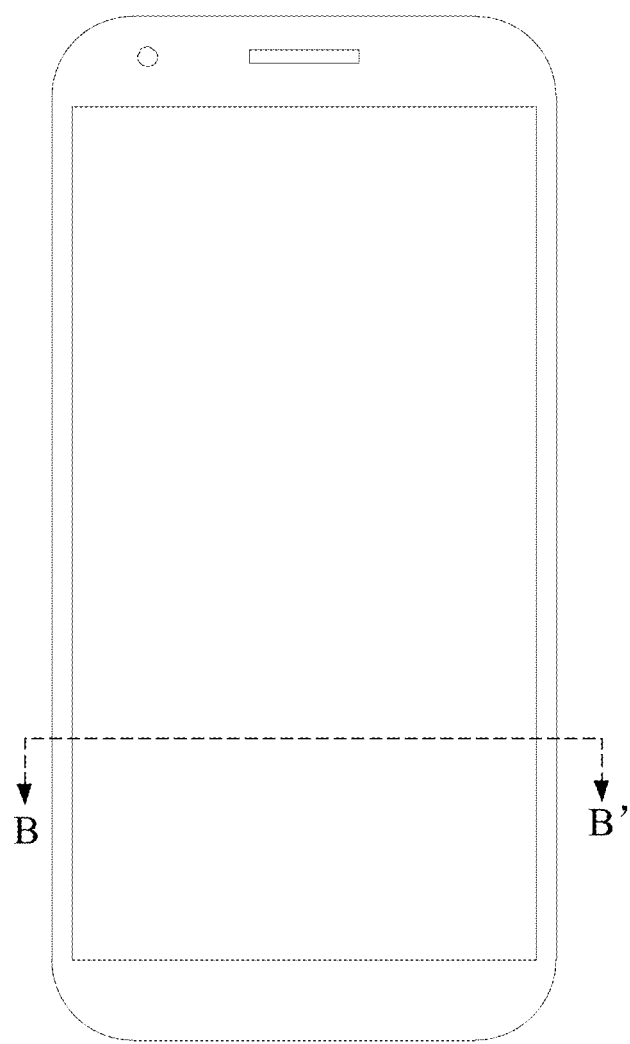
FIG. 19 illustrates a schematic view of an exemplary display apparatus according to disclosed embodiments.
Figure 20:
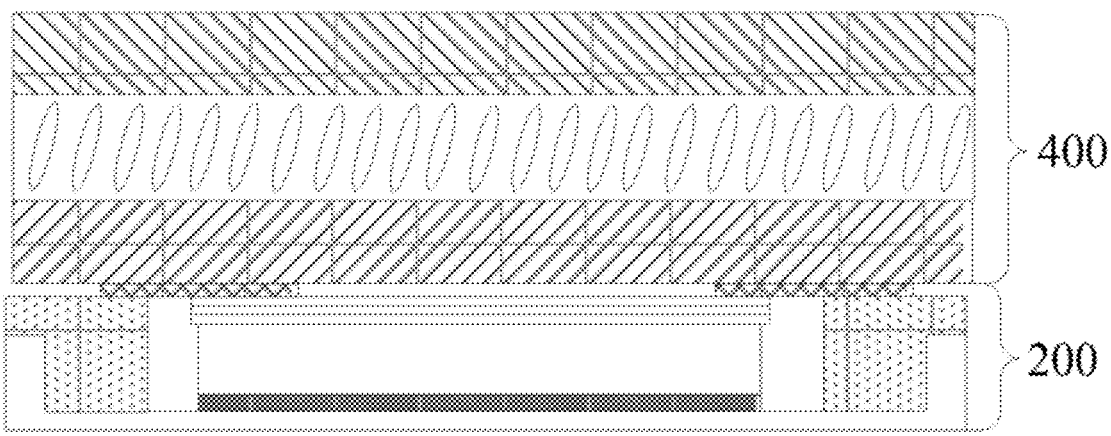
FIG. 20 illustrates a cross-sectional view of an exemplary display apparatus along the BB' line in FIG. 19.

Based on the same inventive concept, the present disclosure also provides a display apparatus 300. FIG. 19 illustrates a schematic view of an exemplary display apparatus according to disclosed embodiments. FIG. 20 illustrates a cross-sectional view of an exemplary display apparatus along the BB' line in FIG. 19. In one embodiment, as shown in FIG. 19 and FIG. 20, the display apparatus 300 may include a display panel 400 and a backlight module 200. The backlight module 200 may be any of the backlight modules 200 provided in the embodiments of the present disclosure. The display apparatus 300 may have the same features and functions as the backlight module 200, which may be referred to the embodiments previously described for the backlight module 200 and will not be repeated herein. It should be noted that the display apparatus provided by the embodiments of the present disclosure may be any products or components having a practical function, such as mobile phones, tablet computers, television sets, monitors, notebook computers, digital picture frames, and navigation devices.

It can be seen from the above described embodiments that the LED backlight, the backlight module, and the display apparatus according to the present disclosure achieve at least the following beneficial effects.

The present disclosure provides an LED backlight, a backlight module, and a display apparatus. The prism-shaped light guide structures may be introduced in the LED backlight. The prism-shaped light guide structures may be disposed between adjacent LED chips, and specifically, may be disposed in a space defined between two adjacent second light emitting surfaces of adjacent LED chips. In prior art, light emitted from the side surfaces of the LED chips is often wasted and is unable to emit from the light emitting surface of the LED backlight. In the present disclosure, after the prism-shaped light guide structures are introduced, at least a portion of light emitted from the side surfaces or the second light emitting surfaces of the LED chips may be guided by the prism-shaped light guide structures to exit from the light emitting surface of the LED backlight. In this way, the light emitted from the side surfaces of the LED chips can be effectively utilized, and the effective utilization rate of the light emitted from the LED chips may be increased. At the same time, the issue of darkness in the region between adjacent LED chips may be effectively mitigated, which is beneficial to improve the uniformity of the light emitted from the LED backlight and the backlight module, and to substantially reduce the occurrence of the so-called "*Gypsophila*" symptom. Thus, the display effectiveness of the display apparatus may be improved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:
1. An LED backlight, comprising:
a substrate;
a plurality of LED chips disposed on a first surface of the substrate and electrically connected to the substrate, wherein each LED chip includes a first light emitting surface disposed on a side of the LED chip facing away from the substrate and at least one second light emitting surface, and a plane where the at least one second light emitting surface is located intersects with the substrate;
a plurality of prism-shaped light guide structures disposed between adjacent LED chips and in a space between two adjacent second light emitting surfaces of adjacent LED chips, wherein the prism-shaped light guide structures have an index of refraction of n1; and a first medium filling the space between the LED chips and the prism-shaped light guide structures, wherein the first medium has an index of refraction of n2 and n1>n2, wherein:
at least a portion of light emitted from the second light emitting surfaces of the LED chips is guided by the prism-shaped light guide structures to emit from a light emitting surface of the LED backlight; and the light emitting surface of the LED backlight is parallel with a plane where the first light emitting surface is located.

2. The LED backlight according to claim 1, wherein:
the LED chips are Mini LED chips that have a die size between approximately 100 μm and 1,000 μm;
a distance between centers of any two adjacent LED chips is D1; and
1 mm≤D1≤5 mm.

3. The LED backlight according to claim 2, wherein:
a distance between two adjacent second light emitting surfaces of any two adjacent LED chips is D2; and
0.5 mm≤D2≤4.5 mm.

4. The LED backlight according to claim 1, wherein:
the first light emitting surface is parallel with a plane where the substrate is located; and
each prism-shaped light guide structure has a third light emitting surface, which is parallel with the plane where the substrate is located.

5. The LED backlight according to claim 4, wherein:
a distance between the third light emitting surface of the prism-shaped light guide structure and the substrate is greater than or equal to a distance between the first light emitting surface of the LED chip and the substrate.

6. The LED backlight according to claim 4, wherein:
the LED chips are arranged in an array on the first surface of the substrate along a first direction and a second direction;
the prism-shaped light guide structures disposed between two adjacent columns of the LED chips are integrally formed and extend in the second direction; and
the prism-shaped light guide structures disposed between two adjacent rows of the LED chips are integrally formed and extend in the first direction.

7. The LED backlight according to claim 6, wherein:
the prism-shaped light guide structure is a triangular prism;
a first vertical cross-section of the prism-shaped light guide structure is an isosceles triangle;
a plane where a bottom side of the isosceles triangle is located is the third light emitting surface;
an apex angle of the isosceles triangle is located between the third light emitting surface and the substrate; and
the first vertical cross-section is perpendicular to the substrate and is parallel with the first direction or the second direction.

8. The LED backlight according to claim 7, wherein:
the apex angle of the isosceles triangle is γ; and
$\sin \gamma \cdot \sqrt{(n1/n2)^2 - \sin^2(\gamma/2)} - \cos \gamma \sin(\gamma/2) = 1$.

9. The LED backlight according to claim 7, wherein:
one prism-shaped light guide structure is disposed between any two adjacent LED chips.

10. The LED backlight according to claim 6, wherein:
the prism-shaped light guide structure is a triangular prism;
a first vertical cross-section of the prism-shaped light guide structure is an isosceles right triangle;

a plane where a first leg of the isosceles right triangle is located is the third light emitting surface;
a plane where a second leg of the isosceles right triangle is located is a light incident surface for receiving light emitted from the second light emitting surface of the LED chip adjacent to the second leg; and
the first vertical cross-section is perpendicular to the substrate and is parallel with the first direction or the second direction.

11. The LED backlight according to claim 10, wherein:
$n1/n2 \geq 1.414$.

12. The LED backlight according to claim 10, wherein:
two prism-shaped light guide structures are disposed between any two adjacent LED chips; and
the two prism-shaped light guide structures are symmetrical with respect to the first vertical cross-section.

13. The LED backlight according to claim 1, further including:
a light guide substrate disposed on a side of the LED chip away from the substrate, wherein:
the prism-shaped light guide structures are disposed on a surface of the light guide substrate adjacent to the substrate; and
the light guide substrate and the prism-shaped light guide structures are integrally formed.

14. The LED backlight according to claim 13, further including:
a fluorescent film disposed on a surface of the light guide substrate away from the substrate.

15. The LED backlight according to claim 13, further including:
a fluorescent powder at least doped in the light guide substrate.

16. The LED backlight according to claim 13, further including:
a fluorescent film disposed on the first light emitting surface and the second light emitting surface.

17. The LED backlight according to claim 1, wherein:
the prism-shaped light guide structures include a light guide glue; and
the light guide glue includes one of silicone, photosensitive glue, and thermally cured glue.

18. The LED backlight according to claim 1, wherein:
the first medium is air or silicone.

19. A backlight module, comprising an LED backlight, which includes:
a substrate;
a plurality of LED chips disposed on a first surface of the substrate and electrically connected to the substrate, wherein each LED chip includes a first light emitting surface disposed on a side of the LED chip facing away from the substrate and at least one second light emitting surface, and a plane where the at least one second light emitting surface is located intersects with the substrate;
a plurality of prism-shaped light guide structures disposed between adjacent LED chips and in a space between two adjacent second light emitting surfaces of adjacent LED chips, wherein the prism-shaped light guide structures have an index of refraction of n1; and
a first medium filling the space between the LED chips and the prism-shaped light guide structures, wherein the first medium has an index of refraction of n2 and n1>n2,
wherein:
at least a portion of light emitted from the second light emitting surfaces of the LED chips is guided by the prism-shaped light guide structures to emit from a light emitting surface of the LED backlight; and the light emitting surface of the LED backlight is parallel with a plane where the first light emitting surface is located.

20. A display apparatus, comprising:

a display panel; and a backlight module including an LED backlight, the LED backlight including:

a substrate;

a plurality of LED chips disposed on a first surface of the substrate and electrically connected to the substrate, wherein each LED chip includes a first light emitting surface disposed on a side of the LED chip facing away from the substrate and at least one second light emitting surface, and a plane where the at least one second light emitting surface is located intersects with the substrate;

a plurality of prism-shaped light guide structures disposed between adjacent LED chips and in a space between two adjacent second light emitting surfaces of adjacent LED chips, wherein the prism-shaped light guide structures have an index of refraction of n1; and a first medium filling the space between the LED chips and the prism-shaped light guide structures, wherein the first medium has an index of refraction of n2 and n1>n2, wherein:

at least a portion of light emitted from the second light emitting surfaces of the LED chips is guided by the prism-shaped light guide structures to emit from a light emitting surface of the LED backlight; and the light emitting surface of the LED backlight is parallel with a plane where the first light emitting surface is located.

* * * * *